United States Patent
Tojo et al.

(10) Patent No.: US 12,051,329 B2
(45) Date of Patent: Jul. 30, 2024

(54) NOTIFICATION DEVICE

(71) Applicant: ISUZU MOTORS LIMITED, Tokyo (JP)

(72) Inventors: Tomokazu Tojo, Fujisawa (JP); Naoki Takahashi, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 85 days.

(21) Appl. No.: 17/759,515

(22) PCT Filed: Jan. 29, 2021

(86) PCT No.: PCT/JP2021/003241
§ 371 (c)(1),
(2) Date: Jul. 27, 2022

(87) PCT Pub. No.: WO2021/153732
PCT Pub. Date: Aug. 5, 2021

(65) Prior Publication Data
US 2023/0095910 A1  Mar. 30, 2023

(30) Foreign Application Priority Data
Jan. 30, 2020 (JP) .................. 2020-013539

(51) Int. Cl.
*B60Q 1/00*  (2006.01)
*G08G 1/16*  (2006.01)

(52) U.S. Cl.
CPC ..................... *G08G 1/16* (2013.01)

(58) Field of Classification Search
CPC .... G08G 1/16; G08G 1/166; B60K 2370/178; B60K 2370/179; B60K 35/00; B60K 35/28; B60Q 9/008; B60W 50/14
(Continued)

(56) References Cited

U.S. PATENT DOCUMENTS 6,097,285 A * 8/2000 Curtin ................. B60Q 5/005
340/384.1
6,876,298 B2 * 4/2005 Litkouhi ............... B60Q 9/006
180/274

(Continued)

FOREIGN PATENT DOCUMENTS

JP  2010-208606 A  9/2010
JP  2011-063225 A  3/2011

(Continued)

OTHER PUBLICATIONS

International Search Report of PCT/JP2021/003241 dated Mar. 16, 2021.

*Primary Examiner* — Anh V La
(74) *Attorney, Agent, or Firm* — Shih IP Law Group, PLLC

(57) ABSTRACT

Disclosed is a notification device that reduces notifications which are bothersome to passengers. This notification device comprises: a pair of detection units that are disposed so as to be separated from one another in a vehicle-width direction and that each detect an object approaching a vehicle; a pair of notification units that are disposed so as to respectively correspond to the pair of detection units and that notify a passenger of the approach of the object; a calculation unit that calculates the position and direction of movement of the object on the basis of detection information from the pair of detection units; and a notification control unit that controls the pair of notification units on the basis of the position and direction of movement of the object calculated by the calculation unit. If an object detected by one of the detection units moves toward the detection range of the other detection unit, the notification control unit controls the other notification unit corresponding to the other detection unit such that the degree of notification is suppressed in (Continued)

comparison to the one notification unit corresponding to the one detection unit.

4 Claims, 2 Drawing Sheets

(58) Field of Classification Search
USPC .................. 340/436, 435, 903, 384.1, 425.5
See application file for complete search history.

(56) References Cited

U.S. PATENT DOCUMENTS

| 8,212,659 | B2 * | 7/2012 | Iwamoto | B60W 50/14 |
| | | | | 340/436 |
| 10,511,911 | B2 * | 12/2019 | Kim | B60Q 9/00 |
| 2020/0003917 | A1 * | 1/2020 | Maeda | G06F 3/16 |
| 2020/0086788 | A1 * | 3/2020 | Pivnicka | B60K 35/00 |
| 2020/0254877 | A1 * | 8/2020 | Nakajima | B32B 17/10036 |

FOREIGN PATENT DOCUMENTS

| JP | 2016-211982 A | 12/2016 |
| JP | 2017-186008 A | 10/2017 |
| JP | 2017-224165 A | 12/2017 |

* cited by examiner

NOTIFICATION DEVICE

TECHNICAL FIELD

The present disclosure relates to a notification apparatus.

BACKGROUND ART

In the related art, a blind spot monitor (BSM) or other notification apparatus that detects objects approaching a vehicle by transmitting, for example, millimeter wave radar around the vehicle and notifies passengers in the vehicle of the approach of the object has been in practical use. Here, commercial vehicles such as trucks are required to detect objects in a wide range from the front of the vehicle to the side of the vehicle because the driver cannot directly see the objects in a wide range.

In view of this, as a technology for detecting objects in a wide range, for example, PTL 1 discloses an apparatus in which a millimeter wave radar is placed at the front of a vehicle and six cameras are placed at the front, both sides, and rear of the vehicle.

CITATION LIST

Patent Literature

PTL 1
Japanese Patent Application Laid-Open No. 2011-063225

SUMMARY OF INVENTION

Technical Problem

However, if a plurality of notification parts corresponding to a plurality of detection parts is disposed in the apparatus disclosed in PTL 1, each time when the moving object is detected at different detection parts, the notification of the approach of the object is provided from the corresponding notification parts, and the notification may be bothersome to the passenger.

An object of the present disclosure is to provide a notification apparatus that reduces the notification that is bothersome to the passenger.

Solution to Problem

A notification apparatus according to the present disclosure includes: a pair of detection parts disposed apart from each other in a vehicle width direction, and configured to detect an object approaching a vehicle; a pair of notification parts disposed corresponding to the pair of detection parts, and configured to provide a passenger with a notification of approach of the object; a calculation part configured to calculate a position and a movement direction of the object on a basis of detection information of the pair of detection parts; and a notification control part configured to control the pair of notification parts on a basis of the position and the movement direction of the object calculated by the calculation part. When the object detected by one of the pair of detection parts moves toward a detection range of the other of the pair of detection parts, the notification control part controls the other of the pair of notification parts corresponding to the other of the pair of detection parts so as to suppress a level of the notification than one of the pair of notification parts corresponding to the one of the pair of detection parts.

Advantageous Effects of Invention

According to the present disclosure, the notification that is bothersome to the passenger can be reduced.

DESCRIPTION OF EMBODIMENTS

Embodiments according to the present disclosure are described below with reference to accompanying drawings.

Embodiment 1

Figure 1:
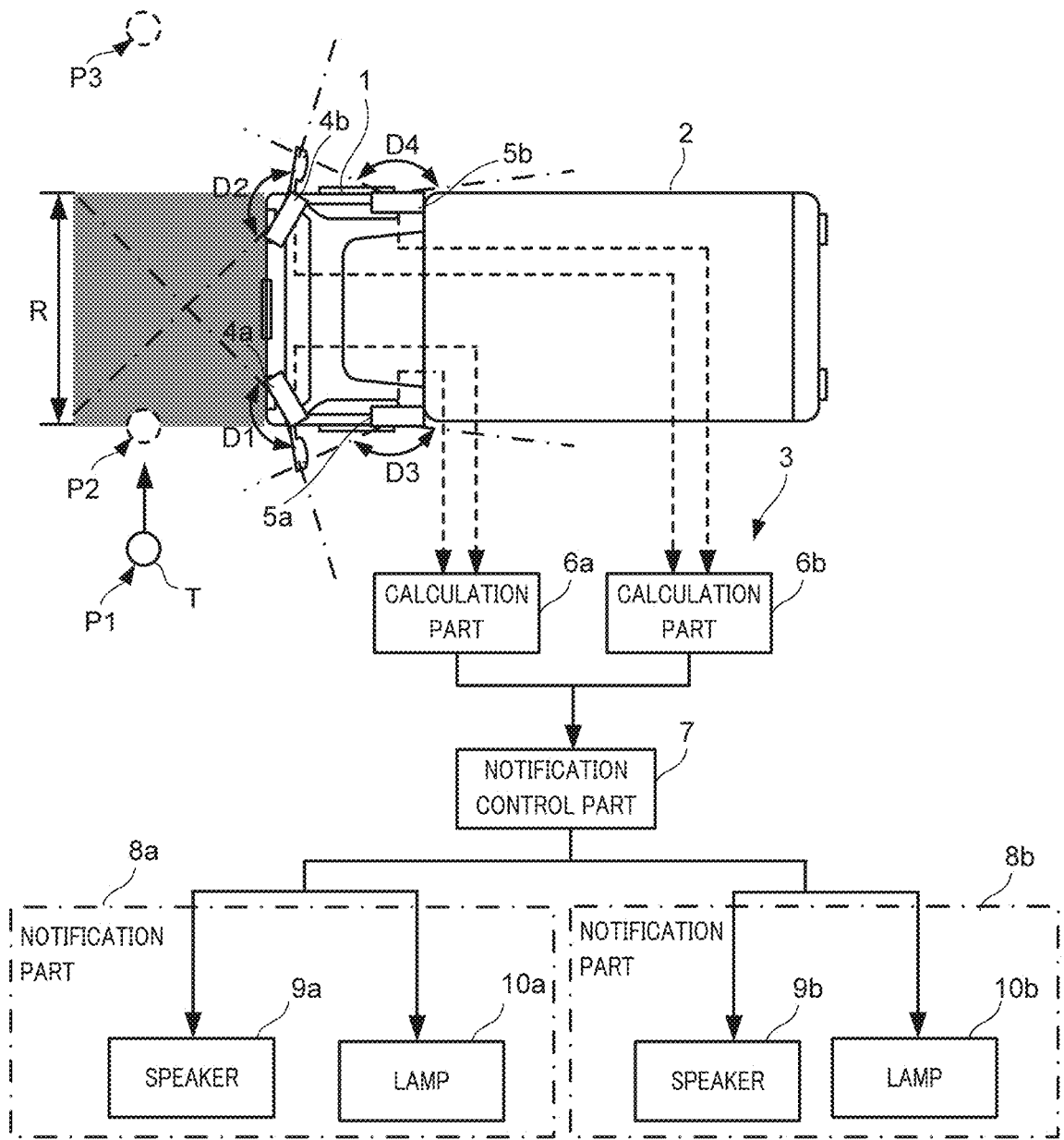
FIG. 1 is a diagram illustrating a configuration of a vehicle including a notification apparatus according to Embodiment 1 of the present disclosure.

FIG. 1 is a diagram illustrating a configuration of a vehicle including a notification apparatus according to Embodiment 1 of the present disclosure. The vehicle includes cabin 1, loading part 2, and notification apparatus 3. Examples of the vehicle include a commercial vehicle such as a truck.

Cabin 1 is configured for passengers to board, and disposed in the front part of the vehicle. In addition, cabin 1 is formed with a length that is within the first half of the vehicle part in the vehicle front-rear direction. Loading part 2 is configured to carry load, and is disposed at the rear of the vehicle relative to cabin 1, for example. Loading part 2 is formed in a shape that is long in the vehicle front-rear direction so as to extend from the vicinity of the rear part of cabin 1 to the vehicle rear part.

Notification apparatus 3 includes a pair of forward detection parts 4a and 4b and a pair of lateral detection parts 5a and 5b. Calculation part 6a is connected to forward detection part 4a and lateral detection part 5a, and calculation part 6b is connected to forward detection part 4b and lateral detection part 5b. Further, calculation parts 6a and 6b are connected to notification parts 8a and 8b through notification control part 7. Notification apparatus 3 may be composed of a blind spot monitor, for example.

Forward detection parts 4a and 4b are disposed apart from each other in the vehicle width direction, and detect an object approaching a vehicle. Forward detection parts 4a and 4b may be composed of millimeter-wave radars that detect an object by transmitting and receiving millimeter waves, for example.

Forward detection part 4a is disposed in the vicinity of the left side part in the front part of cabin 1. Forward detection part 4a includes a detection surface facing the vehicle front side, transmits and receives millimeter waves at this detection surface, and detects the object present in the detection range D1 extending in the front of the detection surface. Here, forward detection part 4a is tilted with the detection surface facing the left side part side.

Forward detection part 4b is disposed in the vicinity of the right side part in the front part of cabin 1. Forward detection part 4b includes a detection surface facing the vehicle front side, transmits and receives millimeter waves at this detection surface, and detects the object present in the detection range D2 extending in the front of the detection surface.

Here, forward detection part 4b is tilted with the detection surface facing the right side part side.

Lateral detection parts 5a and 5b are disposed apart from each other in the vehicle width direction, and detect an object approaching a vehicle. Lateral detection parts 5a and 5b may be composed of millimeter-wave radars that detect an object by transmitting and receiving millimeter waves, for example.

Lateral detection part 5a is disposed in the vicinity of the left side part in the rear part of cabin 1. Lateral detection part 5a includes a detection surface facing the vehicle left lateral side, transmits and receives millimeter waves at this detection surface, and detects the object present in the detection range D3 extending in the front of the detection surface. Lateral detection part 5b is disposed in the vicinity of the right side part in the rear part of cabin 1. Lateral detection part 5b includes a detection surface facing the right lateral side of the vehicle, transmits and receives millimeter waves at this detection surface, and detects the object present in the detection range D4 extending in the front of the detection surface.

Note that forward detection parts 4a and 4b and lateral detection parts 5a and 5b may be disposed at the same height or different heights. For example, lateral detection parts 5a and 5b may be disposed at positions lower than forward detection parts 4a and 4b.

Calculation part 6a is connected to forward detection part 4a and lateral detection part 5a. Calculation part 6a calculates the position and the movement direction of the object located in detection range D1 on the basis of the detection information of forward detection part 4a. In addition, calculation part 6a calculates the position and the movement direction of the object located in detection range D3 on the basis of the detection information of lateral detection part 5a.

Calculation part 6b is connected to forward detection part 4b and lateral detection part 5b. Calculation part 6b calculates the position and the movement direction of the object located in detection range D2 on the basis of the detection information of forward detection part 4b. In addition, calculation part 6b calculates the position and the movement direction of the object located in detection range D4 on the basis of the detection information of lateral detection part 5b.

Notification control part 7 controls notification parts 8a and 8b on the basis of the position and the movement direction of the object calculated by calculation parts 6a and 6b. Here, when the object detected by forward detection part 4a or lateral detection part 5a moves toward detection range D2 of forward detection part 4b or detection range D4 of lateral detection part 5b, notification control part 7 controls notification part 8b so as to suppress the notification than notification part 8a. Likewise, when the object detected by forward detection part 4b or lateral detection part 5b moves toward detection range D1 of forward detection part 4a or detection range D3 of lateral detection part 5a, notification control part 7 controls notification part 8a so as to suppress the notification than notification part 8b.

Notification part 8a provides the notification of the approach of the object to the passenger, and is disposed corresponding to forward detection part 4a and lateral detection part 5a. Notification part 8a includes speaker 9a and lamp 10a connected to notification control part 7. Notification part 8b provides the notification of the approach of the object to the passenger, and is disposed corresponding to forward detection part 4b and lateral detection part 5b. Notification part 8b includes speaker 9b and lamp 10b connected to notification control part 7.

Figure 2:
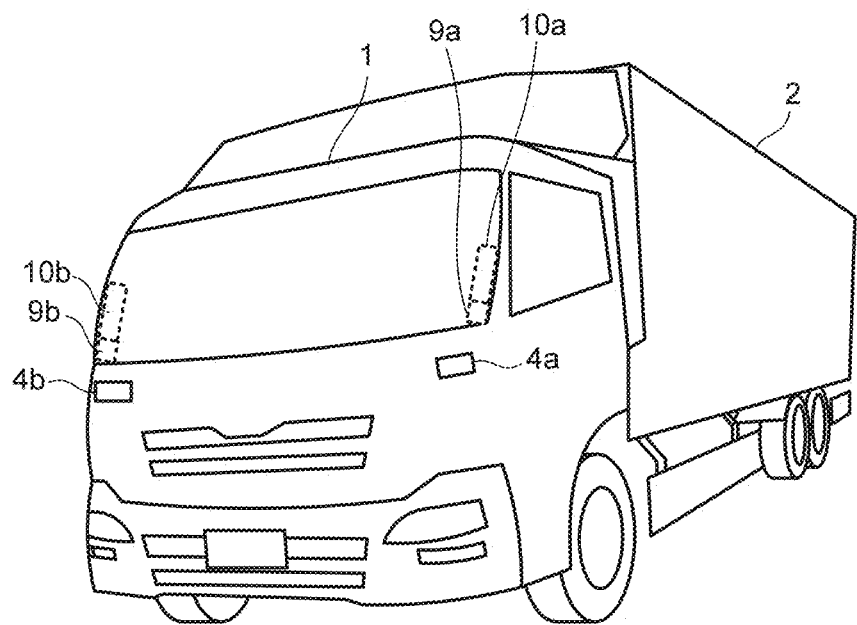
FIG. 2 is a diagram illustrating a state where a speaker and a lamp are disposed.

As illustrated in FIG. 2, speaker 9a and lamp 10a are disposed corresponding to forward detection part 4a and lateral detection part 5a, along the left pillar in the interior of cabin 1. On the other hand, speaker 9b and lamp 10b are disposed corresponding to forward detection part 4b and lateral detection part 5b, along the right pillar in the interior of cabin 1.

Speakers 9a and 9b provide the passenger with the notification of the approach of the object in the form of sound. In addition, lamps 10a and 10b provide the passenger with the notification of the approach of the object in the form of light.

Note that the functions of calculation parts 6a and 6b and notification control part 7 can be implemented with a computer program. For example, the reading apparatus of the computer reads the program for achieving the functions of calculation parts 6a and 6b and notification control part 7 from the recording medium in which the program is recorded, and stores it in the storage apparatus. Then, the CPU copies, in the RAM, the program stored in the storage apparatus, sequentially reads the command included in the program from the RAM and executes it, and thus, the functions of calculation parts 6a and 6b and notification control part 7 can be achieved.

Next, an operation of Embodiment 1 is described.

First, as illustrated in FIG. 1, millimeter waves are transmitted and received from forward detection parts 4a and 4b and lateral detection parts 5a and 5b to detection ranges D1 to D4. When millimeter waves are received at forward detection part 4a and lateral detection part 5a, its reception signal is output to calculation part 6a. On the other hand, when millimeter waves are received at forward detection part 4b and lateral detection part 5b, its reception signal is output to calculation part 6b.

Here, when an object is present in detection ranges D1 to D4, e.g., when an object is present in detection range D1, the millimeter wave reflected by the object is received by forward detection part 4a in a short time, and a reception signal including the detection information of the object is output to calculation part 6a.

Then, calculation part 6a acquires the detection information from the reception signal sequentially output from forward detection part 4a and lateral detection part 5a, and calculates the position of the object located in detection ranges D1 and D3 on the basis of the detection information. In addition, calculation part 6b acquires the detection information from the reception signal sequentially output from forward detection part 4b and lateral detection part 5b, and calculates the position of the object located in detection ranges D2 and D4 on the basis of the detection information. The calculated position of the object is output from calculation parts 6a and 6b to notification control part 7.

Subsequently, when the position of the object is calculated at calculation part 6a, i.e., when the object is detected in detection ranges D1 and D3, notification control part 7 provides the passenger with the notification of the object approaching the vehicle by controlling notification part 8a corresponding to forward detection part 4a and lateral detection part 5a. On the other hand, when the position of the object is calculated at calculation part 6b, i.e., when the object is detected in detection ranges D2 and D4, notification control part 7 provides the passenger with the notification of the object approaching the vehicle by controlling notification part 8b corresponding to forward detection part 4b and lateral detection part 5b. This allows the passenger to recognize the approaching object and stop the vehicle, etc., to prevent the object from colliding with the vehicle.

In addition, calculation parts 6a and 6b calculate the movement direction of the object by tracking the position of the object. Here, when the calculation result of calculation part 6a shows that the object detected by forward detection part 4a or lateral detection part 5a moves toward detection range D2 of forward detection part 4b or detection range D4 of lateral detection part 5b, notification control part 7 controls notification part 8a so as to provide the notification at the normal degree, while controlling notification part 8b so as to stop the notification. Likewise, when the calculation result of calculation part 6b shows that the object detected by forward detection part 4b or lateral detection part 5b moves toward detection range D1 of forward detection part 4a or detection range D3 of lateral detection part 5a, notification control part 7 controls notification part 8b so as to provide the notification at the normal degree, while controlling notification part 8a so as to stop the notification.

For example, when object T moving in detection range D1 is detected by forward detection part 4a, calculation part 6a calculates position P1 of object T on the basis of the reception signal from forward detection part 4a. In addition, calculation part 6a calculates the movement direction of object T by tracking the position of object T. Subsequently, calculation part 6a calculates whether object T moves from position P1 toward detection range D2 of forward detection part 4b, and outputs the calculation result to notification control part 7.

When calculation part 6a calculates that object T does not move toward detection range D2 of forward detection part 4b, notification control part 7 controls notification part 8a so as to provide the notification at the normal degree.

On the other hand, when calculation part 6a calculates that object T moves toward detection range D2 of forward detection part 4b, notification control part 7 controls notification part 8a so as to provide the notification at the normal degree, while controlling notification part 8b so as to stop the notification even when object T is detected at forward detection part 4b. In this manner, as illustrated in FIG. 2, the notification is provided at the normal degree from speaker 9a and lamp 10a corresponding to forward detection part 4a, while the notification from speaker 9b and lamp 10b corresponding to forward detection part 4b is stopped even when object T is detected by forward detection part 4b. At this time, notification control part 7 can stop the notification of the notification part 8b for a predetermined time in which object T moves from position P1 to position P3, which is a sufficiently separated position on the right lateral side of the vehicle, for example. Note that the predetermined time may be set in advance in accordance with the detection position of object T, or may be calculated based on the detection position and the speed of object T.

In general, when object T detected by forward detection part 4a moves toward detection range D2 of forward detection part 4b, object T is detected by forward detection part 4a and forward detection part 4b, and as such the notification is also provided at the normal degree by notification part 8b corresponding to forward detection part 4b after the notification is provided at the normal degree by notification part 8a corresponding to forward detection part 4a. In this manner, the notification is provided at the same degree by notification part 8a and notification part 8b for the same object T, the notification may be bothersome to the passenger.

In view of this, when object T detected by forward detection part 4a moves toward detection range D2 of forward detection part 4b, notification control part 7 controls notification part 8b so as to stop the notification even when the object T is detected by forward detection part 4b. In this manner, the notification that is bothersome to the passenger can be reduced.

Note that it suffices that notification control part 7 controls notification part 8b so as to suppress the level of the notification than notification part 8a, and notification control part 7 is not limited to the configuration of controlling notification part 8b so as to stop the notification. For example, notification control part 7 can control notification part 8b so as to provide the notification at a smaller degree than notification part 8a. For example, notification control part 7 may control speaker 9b and lamp 10b so as to provide the notification with a smaller volume and light quantity than speaker 9a and lamp 10a. In addition, notification control part 7 may provide the notification using only lamp 10b by stopping speaker 9b while providing the notification using speaker 9a and lamp 10a.

In addition, in general, since the computation amount largely increases if three or more detection parts are connected to one calculation part 6a, forward detection part 4a and lateral detection part 5a are connected to calculation part 6a and forward detection part 4b and lateral detection part 5b are connected to calculation part 6b. At this time, calculation part 6a and calculation part 6b separately calculate the detection information of forward detection part 4a and lateral detection part 5a and the detection information of forward detection part 4b and lateral detection part 5b, and consequently the general control of notification parts 8a and 8b at notification control part 7 may become difficult.

In view of this, when calculation part 6a calculates that the object detected by forward detection part 4a or lateral detection part 5a moves toward detection ranges D2 and D4 of forward detection part 4b or lateral detection part 5b, notification control part 7 controls notification part 8b so as to suppress the notification than notification part 8a on the basis of the calculation result of calculation part 6a. In this manner, notification control part 7 can control it on the basis of the calculation result of calculation part 6a alone, and thus notification parts 8a and 8b can be generally controlled while suppressing the computation amount.

In this manner, when the notification of the normal degree is provided from notification part 8a, notification control part 7 controls notification part 8a so as to stop the notification on the basis of the elapsed time after the detection of object T at forward detection part 4a. For example, after calculating that object T moves from position P1 toward detection range D2 of forward detection part 4b, calculation part 6a calculates the timing when object T has reached predetermined region R set in front of the vehicle, i.e., position P2. Here, predetermined region R is set in the range between the right side part and the left side part in front of the vehicle, and position P2 is a position corresponding to the left side part of the vehicle. Subsequently, calculation part 6a calculates the time when object T reaches position P3 sufficiently separated on the right side from the vehicle after object T has arrived at position P2. At this time, the time when it reaches position P3 may be preliminarily set corresponding to position P2 of object T, or may be calculated based on position P2 and the speed of object T. These calculation results are sequentially output from calculation part 6a to notification control part 7.

Subsequently, on the basis of the calculation result of calculation part 6a, notification control part 7 starts the notification of notification part 8a when object T is detected at position P1, and stops the notification of notification part 8*a* at the timing when object T has reached position P3. Note that notification control part 7 may stop the notification of notification part 8*b* at the timing of stopping the notification of notification part 8*a*.

In this manner, notification control part 7 stops the notification of notification part 8*a* on the basis of the elapsed time after detection of object T at forward detection part 4*a*, and thus notification parts 8*a* and 8*b* can be generally controlled while suppressing the computation amount.

In addition, when an object other than object T is detected at forward detection part 4*b* or lateral detection part 5*b* when notification control part 7 controls notification part 8*b* so as to suppress the notification than notification part 8*a*, other calculation information representing the position and movement direction of the other object is input to notification control part 7 from calculation part 6*b*. In this manner, notification control part 7 determines that another object is detected by forward detection part 4*b* or lateral detection part 5*b*, releases the suppression of the notification, and provides the notification at the normal degree notification part 8*b*. In this manner, when another object is detected by forward detection part 4*b* or lateral detection part 5*b*, notification control part 7 can appropriately provide the passenger with a notification of the approach of the other object by controlling notification part 8*b* so as to release the suppression of the notification.

Note that also when the object detected by lateral detection part 5*a* moves toward detection range D4 of lateral detection part 5*b*, notification control part 7 can control it in the same manner. In addition, also when the object detected by forward detection part 4*b* or lateral detection part 5*b* moves toward detection ranges D1 and D3 of forward detection part 4*a* or lateral detection part 5*a*, notification control part 7 can control it in the same manner.

According to the present embodiment, when the object detected by forward detection part 4*a* or lateral detection part 5*a* moves toward detection range D2 of forward detection part 4*b* or detection range D4 of lateral detection part 5*b*, notification control part 7 controls notification part 8*b* so as to suppress the level of the notification than notification part 8*a*. Likewise, when the object detected by forward detection part 4*b* or lateral detection part 5*b* moves toward detection range D1 of forward detection part 4*a* or detection range D3 of lateral detection part 5*a*, notification control part 7 controls notification part 8*a* so as to suppress the level of the notification than notification part 8*b*. In this manner, the notification from the notification part corresponding to the detection part that has detected the object later is suppressed, and thus the notification that is bothersome to the passenger can be suppressed.

Embodiment 2

Embodiment 2 of the present disclosure is described below. Here, differences from the above-described Embodiment 1 are mainly described, and the points common to the above-described Embodiment 1 are denoted with the same reference numerals, and, the description thereof is omitted.

Figure 3:
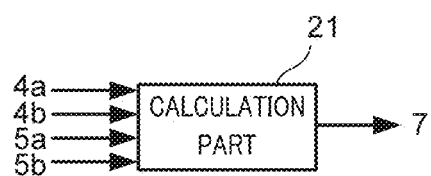
FIG. 3 is a diagram illustrating a main part of a notification apparatus according to Embodiment 2.

While two calculation parts 6*a* and 6*b* are disposed for forward detection parts 4*a* and 4*b* and lateral detection parts 5*a* and 5*b* in the above-described Embodiment 1, the number is not limited to two as long as the calculation part that calculates the position and the movement direction of the object can be installed. For example, as illustrated in FIG. 3, calculation part 21 may be disposed instead of calculation parts 6*a* and 6*b* of Embodiment 1.

Calculation part 21 is connected to forward detection parts 4*a* and 4*b* and lateral detection parts 5*a* and 5*b*. On the basis of the detection information of forward detection parts 4*a* and 4*b* and lateral detection parts 5*a* and 5*b*, calculation part 21 calculates the position and the movement direction of the object located in detection ranges D1 to D4.

In this manner, calculation part 21 calculates it on the basis of the detection information of forward detection parts 4*a* and 4*b* and lateral detection parts 5*a* and 5*b*, and thus the position and the movement direction of the object located in detection ranges D1 to D4 can be calculated with high accuracy.

Subsequently, notification control part 7 controls notification parts 8*a* and 8*b* on the basis of the position and the movement direction of the object calculated by calculation part 21. Specifically, when the object detected by forward detection part 4*a* or lateral detection part 5*a* moves toward detection range D2 of forward detection part 4*b* or detection range D4 of lateral detection part 5*b*, notification control part 7 controls notification part 8*b* so as to suppress the notification than notification part 8*a*. Likewise, when the object detected by forward detection part 4*b* or lateral detection part 5*b* moves toward detection range D1 of forward detection part 4*a* or detection range D3 of lateral detection part 5*a*, notification control part 7 controls notification part 8*a* so as to suppress the notification than notification part 8*b*. In this manner, notification control part 7 controls notification parts 8*a* and 8*b* on the basis of the position and the movement direction of the object calculated by calculation part 21 with high accuracy, and thus the notification that is bothersome to the passenger more can be reliably suppressed.

According to the present embodiment, calculation part 21 calculates the position and the movement direction of the object with high accuracy on the basis of the detection information of forward detection parts 4*a* and 4*b* and lateral detection parts 5*a* and 5*b*. In this manner, notification control part 7 can more reliably suppress the notification that is bothersome to the passenger.

Note that while notification parts 8*a* and 8*b* are disposed apart from each other in the vehicle width direction in the above-described Embodiments 1 and 2, the present invention is not limited to this, and it suffices that they are disposed corresponding to forward detection part 4*a* and lateral detection part 5*a* and forward detection part 4*b* and lateral detection part 5*b*. For example, notification parts 8*a* and 8*b* may be disposed apart from each other in the vertical direction. Noted that it is preferable that notification parts 8*a* and 8*b* are disposed apart from each other in the vehicle width direction since this allows sensory recognition of the position of the object.

In addition, while forward detection parts 4*a* and 4*b* and lateral detection parts 5*a* and 5*b* are disposed in the above-described Embodiments 1 and 2, the present invention is not limited to this and it suffices that a pair of detection parts is disposed apart from each other in the vehicle width direction. For example, only forward detection parts 4*a* and 4*b* may be disposed, or five or more detection parts may be disposed.

In addition, while forward detection parts 4*a* and 4*b* and lateral detection parts 5*a* and 5*b* are disposed in cabin 1 in the above-described Embodiments 1 and 2, the present invention is not limited to this and it suffices that they are disposed apart from each other in the vehicle width direction. For example, lateral detection parts 5*a* and 5*b* may be disposed in the rear part of loading part 2 so as to detect the vehicle rear side. It should be noted that since the mounting operation may be hindered when the detection part is disposed in loading part 2, it is preferable to dispose the detection part only in cabin 1.

In addition, while forward detection parts 4a and 4b and lateral detection parts 5a and 5b are composed of millimeter-wave radars in the above-described Embodiments 1 and 2, the present invention is not limited to this as long as an object approaching a vehicle can be detected. For example, forward detection parts 4a and 4b and lateral detection parts 5a and 5b may be composed of ultrasound sensors, laser radars, cameras, and the like. It should be noted that forward detection parts 4a and 4b and lateral detection parts 5a and 5b are preferably composed of millimeter-wave radars from a view point of rectilinearity and the like.

In addition, while loading part 2 is disposed to carry a load in the above-described Embodiments 1 and 2, the present invention is not limited to this as long as it is disposed at the rear of the vehicle relative to cabin 1.

This application is entitled to and claims the benefit of Japanese Patent Application No. 2020-013539 filed on Jan. 30, 2020, the disclosure each of which including the specification, drawings and abstract is incorporated herein by reference in its entirety.

The above-mentioned embodiments are merely examples of embodiments for implementing the invention, and the technical scope of the invention should not be interpreted as limited by these embodiments. In other words, the invention can be implemented in various forms without deviating from its gist or its main features. For example, the disclosure of the shape and number of each part described in the above form is only an example and can be changed and implemented as appropriate.

INDUSTRIAL APPLICABILITY

The notification apparatus according to the present disclosure can be used for an apparatus that detects an object approaching a vehicle and provides the notification of the approach of the object to the passenger.

REFERENCE SIGNS LIST

1 Cabin
2 Loading part
3 Notification apparatus
4a, 4b Forward detection part
5a, 5b Lateral detection parts
6a, 6b, 21 Calculation part
7 Notification control part
8a, 8b Notification part
9a, 9b Speaker
10a, 10b Lamp
D1 To D4 Detection range
T Object
P1 To P3 Position
R Predetermined region

What is claimed is:

1. A notification apparatus, comprising:
a pair of detection parts disposed apart from each other in a vehicle width direction, and configured to detect an object approaching a vehicle;
a pair of notification parts disposed corresponding to the pair of detection parts, and configured to provide a passenger with a notification of approach of the object;
a calculation part configured to calculate a position and a movement direction of the object on a basis of detection information of the pair of detection parts; and
a notification control part configured to control the pair of notification parts on a basis of the position and the movement direction of the object calculated by the calculation part, wherein
when the object detected by one of the pair of detection parts moves toward a detection range of an other of the pair of detection parts, the notification control part is configured to control one of the pair of notification parts and an other of the pair of notification parts to suppress a level of the notification from the other of the pair of notification parts corresponding to the other of the pair of detection part compared to the one of the pair of notification parts corresponding to the one of the pair of detection parts, and to continuously suppress the level of the notification from the other of the pair of notification parts even after the object is detected by the other of the pair of detection parts as a result of movement.

2. The notification apparatus according to claim 1, wherein the calculation part includes:
a first calculation part configured to calculate the position and the movement direction of the object on a basis of detection information of the one of the pair of detection parts, and
a second calculation part configured to calculate the position and the movement direction of the object on a basis of detection information of the other of the pair of detection parts, and
wherein the notification control part is configured to suppress, when the object detected by the one of the pair of detection parts moves toward the detection range of the other of the pair of detection parts, the level of the notification from the other of the pair of notification parts based on a calculation result of the first calculation part.

3. The notification apparatus according to claim 1, wherein the notification control part is configured to control the one of the pair of notification parts so as to stop a notification on a basis of an elapsed time after the object is detected by the one of the pair of detection parts.

4. The notification apparatus according to claim 1, wherein when another object is detected by the other of the pair of detection parts, the notification control part is configured to control the other of the pair of notification parts so as to release suppression of a notification.

* * * * *